United States Patent
Ray et al.

(10) Patent No.: US 10,732,368 B1
(45) Date of Patent: Aug. 4, 2020

(54) FIBER DISTRIBUTION BOX WITH ADJUSTABLE BULKHEAD

(71) Applicant: All Systems Broadband, Inc., Livermore, CA (US)

(72) Inventors: Craig Dwayne Ray, Raleigh, NC (US); Shawn Leroux Heeter, Morrisville, NC (US)

(73) Assignee: All Systems Broadband, Inc., Livermore, CA (US)

( * ) Notice: Subject to any disclaimer, the term of this patent is extended or adjusted under 35 U.S.C. 154(b) by 0 days.

(21) Appl. No.: 16/448,255

(22) Filed: Jun. 21, 2019

(51) Int. Cl.
*G02B 6/44* (2006.01)

(52) U.S. Cl.
CPC .................. *G02B 6/4441* (2013.01)

(58) Field of Classification Search
CPC .................................................. G02B 6/4441
See application file for complete search history.

(56) References Cited

U.S. PATENT DOCUMENTS

| | | | | |
|---|---|---|---|---|
| 7,236,677 B2 * | 6/2007 | Escoto | ................. | G02B 6/4452 385/134 |
| 9,038,832 B2 * | 5/2015 | Hernandez-Ariguznaga | ............... | G02B 6/4452 211/26 |
| 2017/0322385 A1 * | 11/2017 | Harisi | ................. | G02B 6/4452 |

* cited by examiner

*Primary Examiner* — Ryan A Lepisto
(74) *Attorney, Agent, or Firm* — Murphy, Bilak & Homiller, PLLC

(57) ABSTRACT

A telecommunications box includes a back panel, outer sidewalls that adjoin the back panel and form an enclosed loop around an interior volume, and a bulkhead that divides the interior volume into first and second cable storage regions. The bulkhead includes a generally planar lower panel that is fixedly attached to the back panel, a generally planar upper panel having an opening that is dimensioned to receive one or more standardized fiber optic connectors, and a connection mechanism that is configured to permit the upper panel to be positioned in a first position and a second position. The first and second positions are different angular orientations of the upper panel relative to the back panel. The connection mechanism mechanically couples an upper edge side of the lower panel with a lower edge side of the upper panel in both of the first and second positions.

18 Claims, 5 Drawing Sheets

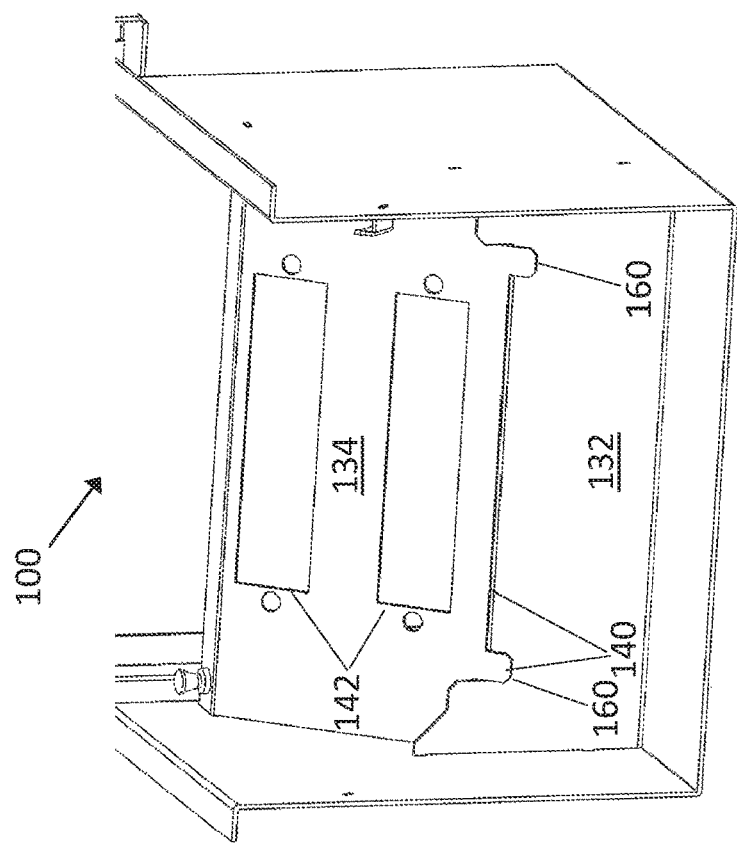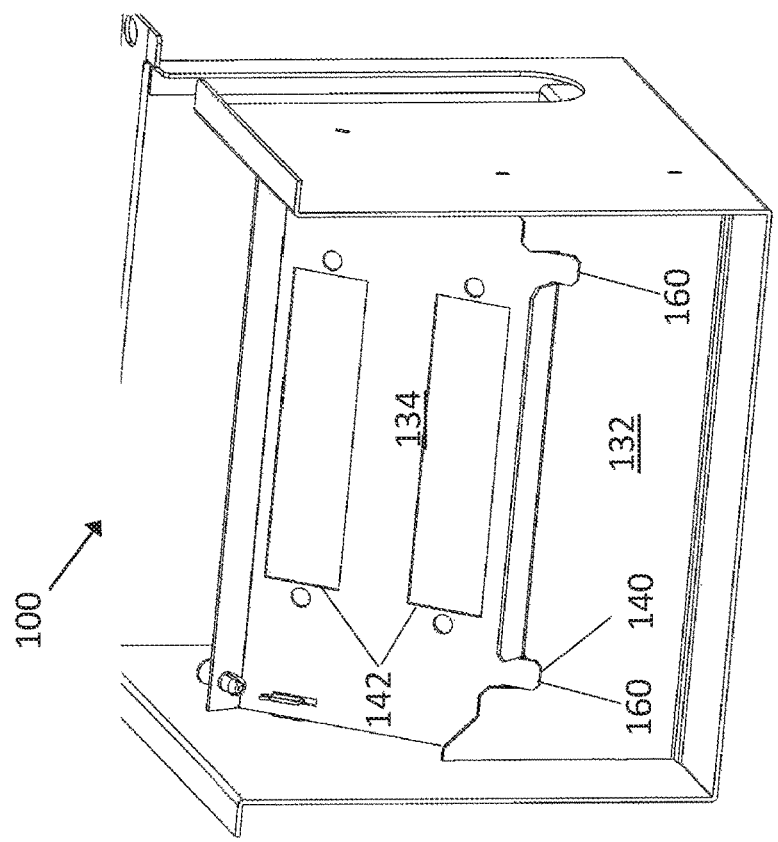
FIGURE 5

FIBER DISTRIBUTION BOX WITH ADJUSTABLE BULKHEAD

TECHNICAL FIELD

The present invention generally relates to optical communications equipment, and particularly relates to fiber demarcation boxes used to connect network side fiber optic cable to customer side fiber optic cable.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth and lower losses.

So-called fiber to the premises (FTTP) fiber optic network configurations are becoming more prevalent. FTTP network configurations provide a complete fiber optic connection from the service provider's network to the customer's service location. These configurations are desirable because the high bandwidth capability of fiber optic transmission is brought directly to the service point.

So-called fiber to the antenna (FTTA) configurations are a kind of FTTP fiber optic network configuration that is employed in wireless telecommunications networks. Wireless telecommunications networks include communications towers with antennas (e.g., panel shaped antennas) mounted at elevation on the tower. These antennas receive and transmit voice and data to user devices in the coverage area. In an FTTA configuration, fiber optic cables are brought directly to the antenna. The antenna includes integrated hardware that is interfaces with the fiber optic connection to transmit and receive data across the fiber optic cable.

As is the case in any FTTP configuration, an FTTA network configuration requires a network node that provide a connection point between the service provider side fiber optic cabling (i.e., the fiber optic cable that is part of the global telecommunications network) and the customer side fiber optic cabling (i.e., the dedicated fiber optic cable that is routed to the service point). A demarcation box may be used to provide this network node. Important design criterion for demarcation boxes for FTTA applications include space-efficiency, ease of access to the stored fiber optic cabling, and ease of connection/disconnection of the stored fiber optic cabling.

SUMMARY

A telecommunications box is disclosed. According to an embodiment, the telecommunications box includes a back panel, outer sidewalls that adjoin the back panel and form an enclosed loop around an interior volume, and a bulkhead that divides the interior volume into first and second cable storage regions. The bulkhead includes a generally planar lower panel that is fixedly attached to the back panel, a generally planar upper panel having an opening that is dimensioned to receive one or more standardized fiber optic connectors, and a connection mechanism that is configured to permit the upper panel to be positioned in a first position and a second position. The first and second positions are different angular orientations of the upper panel relative to the back panel. The connection mechanism mechanically couples an upper edge side of the lower panel with a lower edge side of the upper panel in both of the first and second positions.

According to another embodiment, the telecommunications box includes a back panel, outer sidewalls that adjoin the back panel and form an enclosed loop around an interior volume, and a bulkhead that divides the interior volume into first and second cable storage regions. The bulkhead includes a fixed lower panel, a movable upper panel, and a connection mechanism disposed at an interface between the lower panel and the upper panel. The bulkhead is configured to change the volume of first and second cable storage regions by moving the upper panel from a first position to a second position.

A method of producing a telecommunications box is disclosed. According to an embodiment, the method includes providing an enclosure having a back panel, outer sidewalls that adjoin the back panel and form an enclosed loop around an interior volume, and providing a bulkhead in the enclosure that divides the interior volume into first and second cable storage regions. Providing the bulkhead includes providing a generally planar lower panel that is fixedly attached to the back panel, providing a generally planar upper panel comprising an opening that is dimensioned to receive one or more standardized fiber optic connectors, and providing a connection mechanism that is configured to permit the upper panel to be positioned in a first position and a second position. The first and second positions are different angular orientations of the upper panel relative to the back panel. The connection mechanism mechanically couples an upper edge side of the lower panel with a lower edge side of the upper panel in both of the first and second positions.

BRIEF DESCRIPTION OF THE DRAWINGS

FIGS. 4A and 4B, depicts side views of a telecommunications box without the movable upper panel, according to an embodiment. FIG. 4A depicts a side view of the telecommunications box from the perspective of the first cable storage region. FIG. 4B depicts a side view of the telecommunications box from the perspective of the second cable storage region.

FIG. 5, which includes FIGS. 5A and 5B, depicts side views of a telecommunications box with the movable upper panel engaged with the fixed lower panel, according to an embodiment. FIG. 5A depicts a side view of the telecommunications box from the perspective of the first cable storage region. FIG. 5B depicts a side view of the telecommunications box from the perspective of the second cable storage region.

DETAILED DESCRIPTION

Embodiments of a telecommunications box that provides advantageous space-efficiency and accessibility to fiber optic connectors is described herein. This is made possible by an adjustable bulkhead design. The bulkhead has a two-part configuration, with a lower panel that is fixedly attached to the telecommunications box, and an upper panel that interfaces with the lower panel. When interfaced, the upper panel can be moved between different angular orientations. The movable upper panel accommodates standardized fiber optic connectors, e.g., lucent connectors (LC connectors), standard-duplex fiber-optic connector (SC connectors), etc. The adjustable bulkhead design allows an installer to move the upper panel between angular orientations that provide better access to the connections to which the installer is working on. In an embodiment, the adjustable bulkhead includes mating features that are formed directly at interfacing edge surfaces of the upper and lower panels. These mating features provide a low-cost and effective connection mechanism that allows the upper panel to be mechanically coupled the upper panel to the lower panel and moved between different angular orientations.

Figure 1:
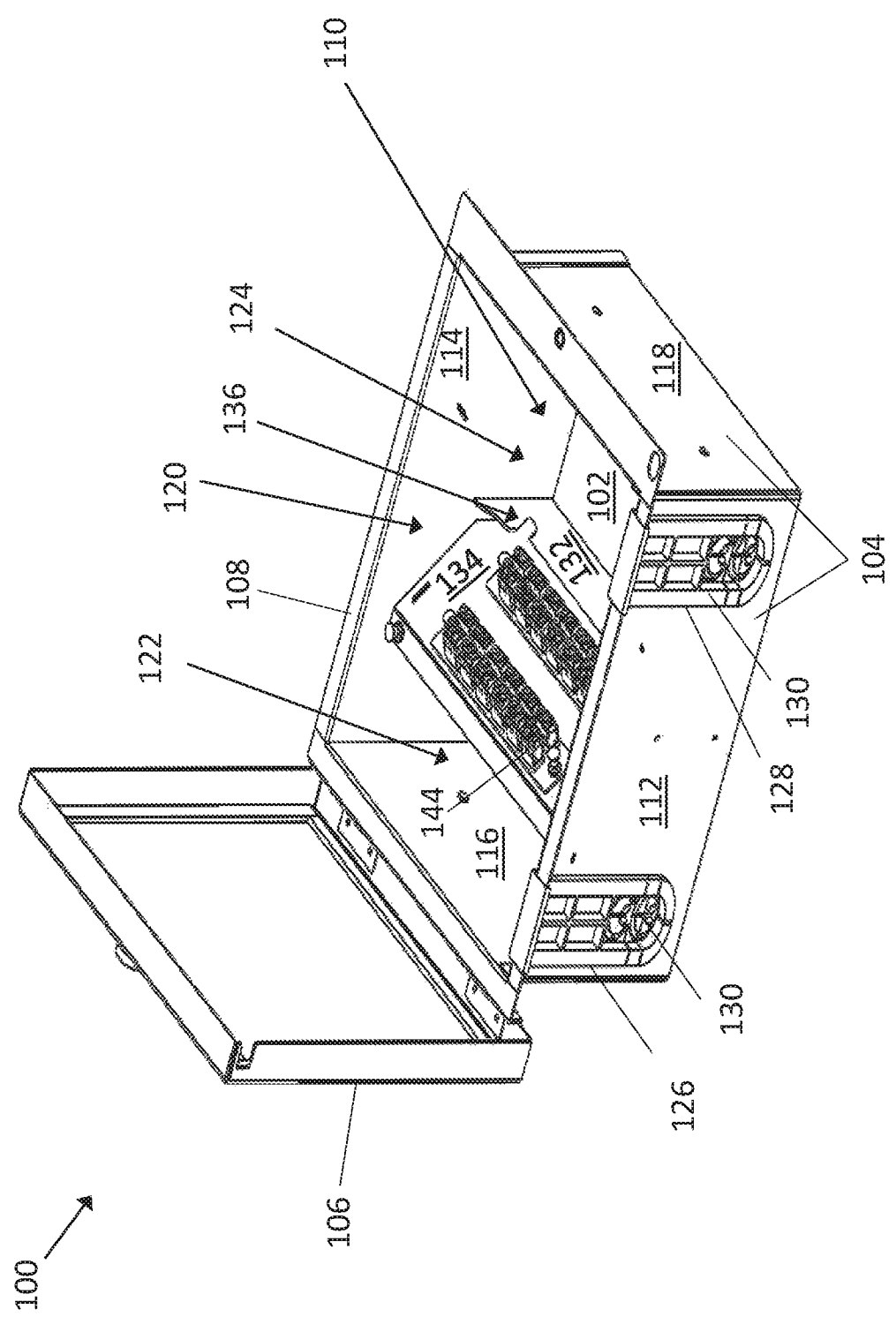
FIG. 1 depicts an isometric view of a telecommunications box with a bulkhead having a fixed lower panel and a movable upper panel, according to an embodiment.

Referring to FIG. 1, a telecommunications box 100 is depicted, according to an embodiment. The telecommunications box 100 includes an enclosure that is provided by a back panel 102, outer sidewalls 104, and a door 106. The outer sidewalls 104 extend from the back panel 102 to front edge sides 108 that are opposite the back panel 102. The outer sidewalls 104 form an enclosed loop, i.e., a closed geometry from a plan view perspective of the telecommunications box 100. This enclosed loop surrounds an interior volume 110, i.e., a three-dimensional space that is contained within the outer sidewalls 104 between the back panel 102 and the front edge sides 108. Put another way, the enclosed loop of the outer sidewalls 104 defines a perimeter of the interior volume 102. The door 106 is configured enclose the interior volume 102 by moving the door 106 into a shut position wherein the door 106 contacts the front edge sides 108.

In the depicted embodiment, the enclosure is configured as a three-dimensional cube, wherein the back panel 102, the outer sidewalls 104, and the door 106 are generally planar structures. The outer sidewalls 104 include first, second, third and fourth outer sidewalls 112, 114, 116 and 118 that form a rectangle around the interior volume 102. The door 106 is parallel to the back panel 102 in the shut position and includes hinges to move the door 106 between the shut position and the shown open position. More generally, the outer sidewalls 104 of the enclosure can include curved surfaces, non-perpendicular angles, etc.

The telecommunications box 100 includes a bulkhead 120. The bulkhead 120 divides the interior volume 102 into first and second cable storage regions 122, 124. This means that the bulkhead 120 provides a barrier between two separate three-dimensional regions of the interior volume 102, and this barrier prohibits fiber optic cable stored in one three-dimensional region from substantially penetrating the three-dimensional region on the opposite side of the bulkhead 120. According to an embodiment, the first cable storage region 122 is a three-dimensional region that is surrounded by the bulkhead 120, the third outer sidewall 124, and portions of the first and second sidewalls 112, 114, and the second cable storage 124 region is a three-dimensional region that is surrounded by the bulkhead 120, the fourth outer sidewall 118, and portions of the first and second sidewalls 112, 114.

According to an embodiment, the telecommunications box 100 includes cable entry ports. These entry ports are passages through the outer sidewalls 114 that permit fiber optic cable to be routed into and stored in one of the first and second cable storage regions 122, 124 with the door 106 in the shut position. In the depicted embodiment, the telecommunications box 100 includes a first and second cable entry ports 126, 128 each being formed in the first sidewall 112. The first cable entry port 126 provides access to the first cable storage region 122. The second cable entry port 128 provides access to the second cable storage region 124. Both of the first and second cable entry ports 126, 128 are formed as a u-shaped recess that extend from the front edge side 108 of the first sidewall 112 towards the back panel 102. More generally, the number, geometry and arrangement of cable entry ports can be different from what is shown. For example, the first and second cable entry ports can be provided in different sidewalls 104 and may be separated from the front edge side 108 of the sidewalls 104.

According to an embodiment, rubber grommets 130 are provided in the first and second cable entry ports. These rubber grommets 130 are optional features that are used to form a relatively airtight seal around the fiber optic cables that are routed through the first and second cable entry ports 126, 128.

The bulkhead 120 includes a lower panel 132 and an upper panel 134. Both the lower panel 132 and the upper panel 134 may be generally planar structures having a substantially uniform thickness. The lower panel 132 and the upper panel 134 are discrete structures, meaning that the lower panel 132 and the upper panel 134 are not constituent parts of a monolithic structure.

The lower panel 132 is fixedly attached to the back panel 102. This means that the lower panel 132 directly contacts the back panel 102 and forms a permanent mechanical connection with the back panel 102. In one embodiment, the lower panel 132 and the back panel 102 are separate structures that are fixedly attached to another by attachment features, e.g., rivets, welds, fasteners, etc. Alternatively, the lower panel 132 and the back panel 102 can be fixedly attached as constituent parts of a monolithic structure. According to the depicted embodiment, the lower panel 132 is fixedly attached to the outer sidewalls 104. This means that the lower panel 132 directly contacts and forms a permanent mechanical connection with the outer sidewalls 104, e.g., according to any of the above described techniques. In the depicted embodiment, lower panel 132 extends between the first and second sidewalls 112, 114 that are spaced apart from one another. Moreover, the lower panel 132 is fixedly attached to the first and second sidewalls 112, 114, e.g., in the same manner as described above with respect to the lower panel 132 and the back panel 102. Hence, in this embodiment, the lower panel 132 forms a complete barrier between the first and second cable storage regions 122, 124. More generally, the lower panel 132 may include gaps between the lower panel 132 and the back panel 102 and/or sidewalls, and may include centrally located openings, provided that these gaps or openings are not large enough to allow stored fiber optic cable in one of the cable storage regions from substantially penetrating the opposite cable storage regions.

The bulkhead 120 includes a connection mechanism 136. The connection mechanism 136 is configured to permit the upper panel 134 to be positioned in a first position and a second position. The first position and second positions are different angular orientations of the upper panel 134 relative to the back panel 102. FIG. 1 illustrates one configuration of the upper panel 134 in a tilted position (i.e. non-parallel and non-perpendicular) with respect to the plane of the back panel 102. This may be considered the first position. In that case, the second position can be considered a position of the upper panel 134 with a different angle of tilt than what is shown in FIG. 1. This different angle of tilt can be in either direction, i.e., a decrease in the angle between the upper panel 134 and back panel 102 or an increase the angle between the upper panel 134 and back panel 102. Moreover, as will be described in further detail below, the second position can be a position that tilts the upper panel 134 in an opposite direction from what is shown, i.e., towards the second cable storage region 124.

The movable configuration of the upper panel 134 means that the volume of the first and second cable storage regions 122, 124 can be changed by moving the upper panel 134 between the first and second positions. By changing an angle of inclination of the upper panel 134 relative to the back panel 102, an increase in the volume of the first cable storage region 122 correspondingly decreases the volume of the second cable store region, and vice-versa.

According to an embodiment, the connection mechanism 136 mechanically couples an upper edge side 138 of the lower panel 132 (identified in FIG. 4) with a lower edge side 140 of the upper panel 134 (identified in FIG. 5) in both of the first and second positions. This means that the connection mechanism 136 provides an interface between the upper edge side 138 of the lower panel 132 and a lower edge side 140 of the upper panel 134, and this interface transmits mechanical force between the upper and lower panels 130, 132 at least in some directions. More particularly, the connection mechanism 136 may be configured to transmit downward force (i.e., force that is perpendicular to and pointed towards the back panel 102) from the upper panel 134 to the lower panel 132 as well as lateral force (i.e., force that is parallel to the back panel 102) from the upper panel 134 to the lower panel 132.

According to an embodiment, the connection mechanism 136 permits the upper panel 134 to be moved from the first position to the second position and vice-versa through application of ordinary manual force. Moreover, when moved into one of these positions, the connection mechanism 136 mechanically couples the upper edge side 138 of the lower panel 132 to the lower edge side 140 of the upper panel 134 in the above described manner. Details of how this mechanical coupling occurs are described in further detail below.

The upper panel 134 includes a pair of openings 142 that are each dimensioned to receive one or more standardized fiber optic connectors 144. These openings 142 may be designed to securely receive individual fiber optic connectors 144. Alternatively, as shown, these openings 142 may be designed to securely receive an attachment which in turn securely receives a plurality of the fiber optic connectors 144. Generally speaking the fiber optic connectors 144 may be any of a wide variety of commercially available fiber optic connector mechanisms, e.g., an LC connector (lucent connector), an SC connector (standard connector), FC connector (ferrule connector), or an ST connector (straight tip connector), to name a few.

Figure 2:
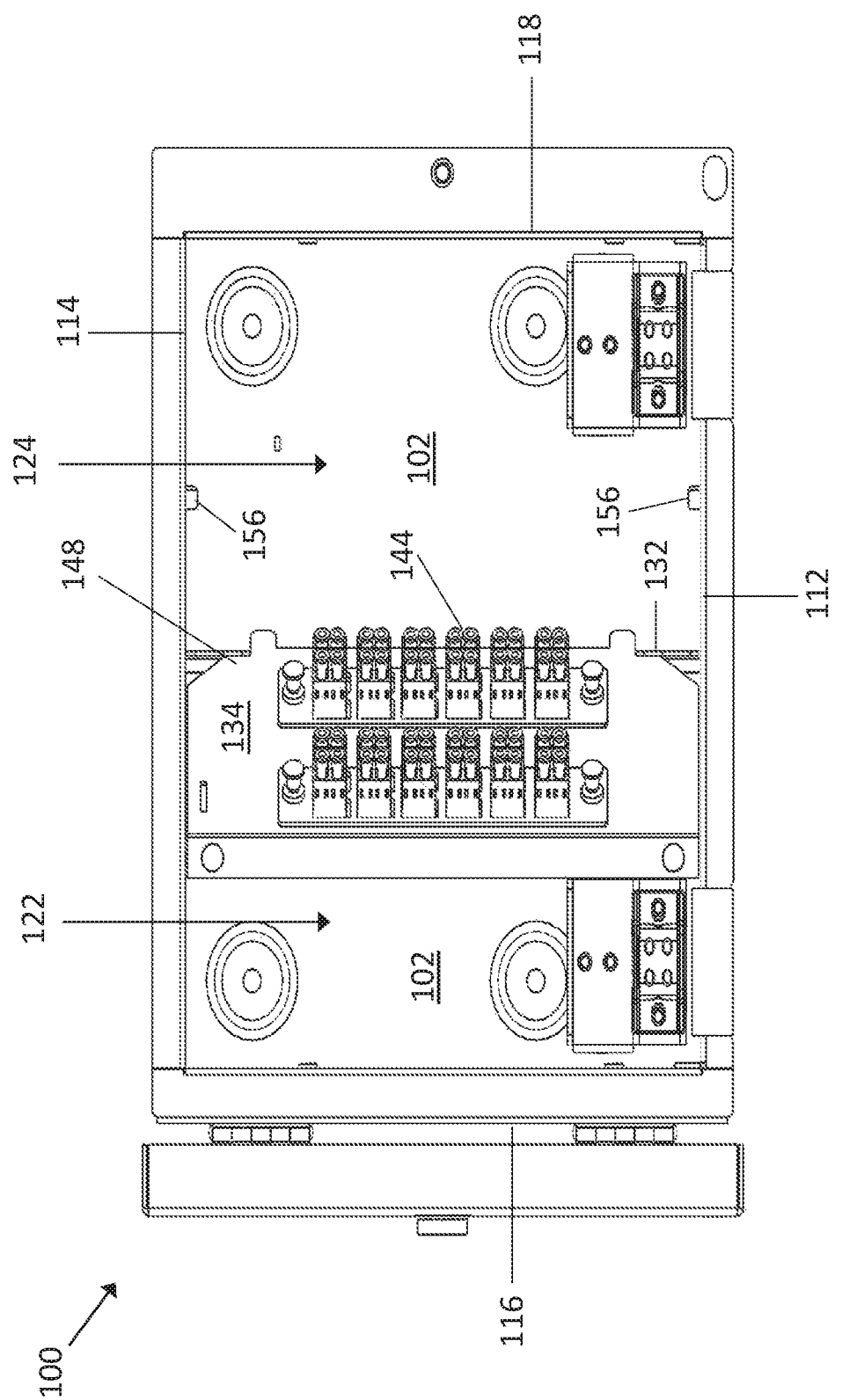
FIG. 2 depicts a plan view of the telecommunications box with the upper panel in a first position, according to an embodiment.
Figure 3:
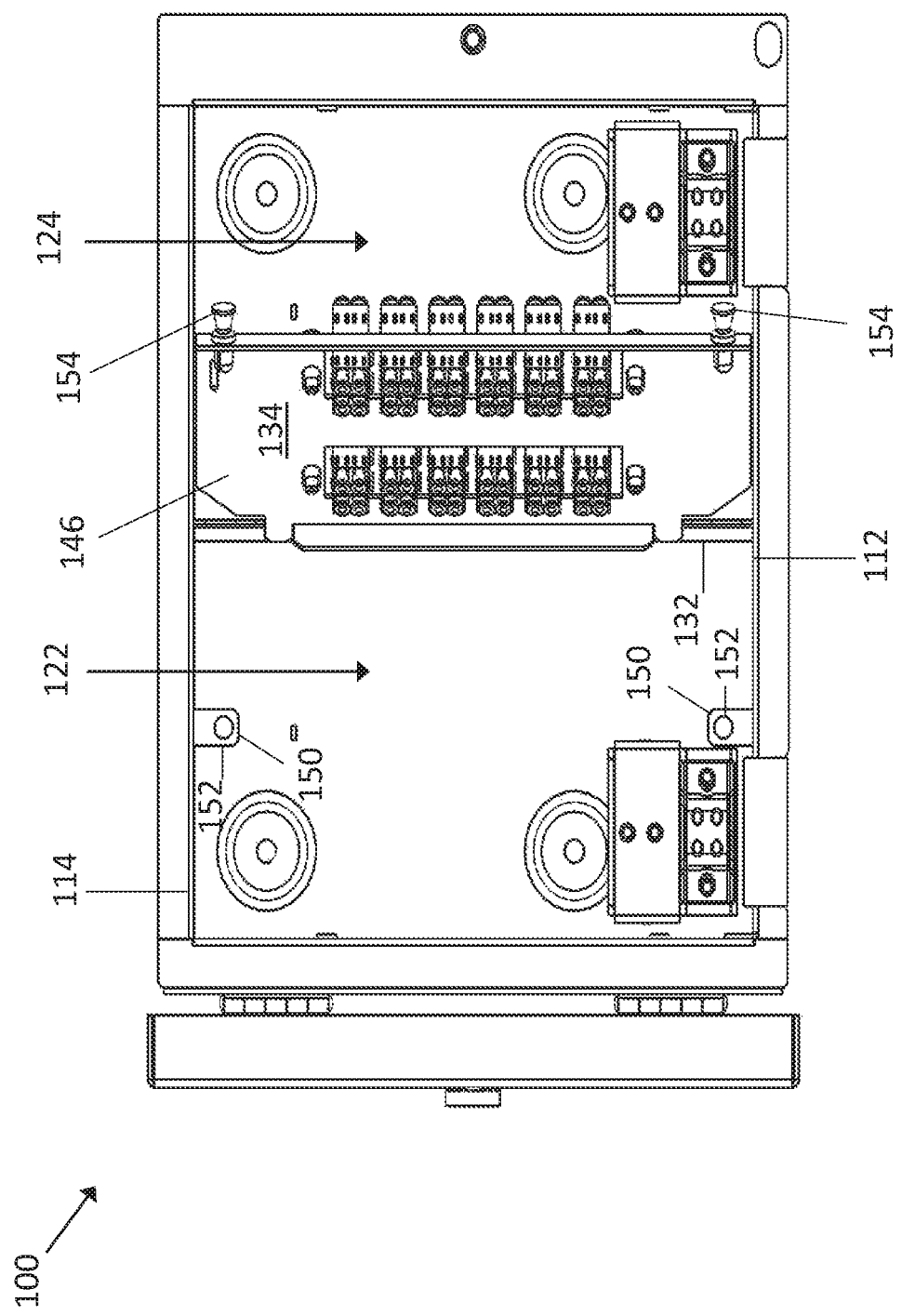
FIG. 3 depicts a plan view of the telecommunications box with the upper panel in a second position, according to an embodiment.

Referring to FIGS. 2 and 3, exemplary configurations of the telecommunications box 100 with the upper panel 134 in different positions are shown, according to an embodiment. FIG. 2 depicts the upper panel 134 in a first position that is titled towards the first cable storage region 122. FIG. 3 depicts the upper panel 134 in a second position that is titled towards the second cable storage region 124. In this discussion, the first and second positions are described with reference to a first face 146 of the upper panel 134 (identified in FIG. 3) and a second face 148 of the upper panel 134 (identified in FIG. 2). These first and second faces 146, 148 respectively face the first and second cable storage regions 122, 124 when the upper panel 134 is in the first and second positions. In the first position, an angle between the first face 146 and the back panel 102 is less than one hundred eighty degrees. As depicted, this angle is about one hundred thirty-five degrees. In the second position, an angle between the second face and the back panel 102 is less than one hundred eighty degrees. As depicted, this angle is about one hundred thirty-five degrees. Hence, in this particular embodiment, the first and second positions represent a symmetric reversal of the internal and external angle of the upper panel 134, relative to the plane of the back panel 102. More generally, the first and second positions may be any different angular orientation of the upper panel 134, relative to the back panel 102. Moreover, the telecommunications box 100 may be configured to place the upper panel 134 in more than two positions, e.g., three, four, five, etc., wherein each position is a different angular orientation of the upper panel 134, using the features and techniques described herein.

According to an embodiment, the telecommunications box 100 is configured such that in the first position, the first cable storage region 122 has a greater volume than the second cable storage region, and in the second position, the second cable storage region 124 has a greater volume than the first cable storage region 122. The depicted embodiment represents one example of this configuration. In this embodiment, the lower panel 132 is substantially perpendicular to the back panel 102 and is positioned substantially equidistant between the third and fourth outer sidewalls 116, 118. Hence, the lower panel 132 is parallel to a plane that bisects the interior volume 102 into two equal sized regions. By tilting the upper panel 134 away from this plane, the first cable storage region 122 can be made larger than the second cable storage region 124 (e.g., as shown in FIG. 3) and the second cable storage region 124 can be made larger than the first cable storage region 122 (e.g., as shown in FIG. 2). More generally, the lower panel 132 can be arranged in a variety of locations, including those in which there is unequal volume of interior space on either side of the lower panel 132.

According to an embodiment, the telecommunications box 100 includes an attachment mechanism that is configured to securely retain the upper panel 134 to at least one of the outer sidewalls 104 in the first position. That is, the attachment mechanism forms a mechanical connection between the upper panel 134 and the outer sidewalls 104 that prevents the upper panel 134 from being moved in any direction. This mechanical connection is effectuated through engagement of the attachment mechanism. The attachment mechanism may form the mechanical connection at or near an upper edge side of the upper panel 134 thereby minimizing leverage over the upper panel 134 when secured.

In the depicted embodiment, the attachment mechanism includes planar tabs 150 (identified in FIG. 3) that extend away from each of the first and second sidewalls 112, 114. These planar tabs 150 each include a perforation 152 that is dimensioned to securely receive and retain a fastening mechanism. Additionally, the attachment mechanism includes a push-pin style fastener 154. The push-pin fastener 154 is provided on an angled plane of the upper panel 134 that is parallel to the planar tabs 150 when the upper panel 134 is disposed in the first position. One example of a push-pin fastener 154 that may be used is a NYLATCH Two-Piece Panel Fastener 154 manufactured by Southco®. The upper panel 134 is securely retained in the first position by inserting the push-pin style fasteners 154 through the perforations 152 in the planar tabs 150 and pushing a plunger portion of the push-pin style fastener 154 to cause the lower portion of the plunger to expand. More generally, the attachment mechanism can be implemented by a variety of known fasteners, e.g., screws, nuts, and bolts, clips, rubber bands and posts, etc. Moreover, the attachment mechanism may be provided on only one of the sidewalls 104 in contrast to the depicted embodiment.

According to an embodiment, the telecommunications box 100 includes a stabilization mechanism that is configured to that maintain the upper panel 134 in the second position. The stabilization mechanism provides, in addition to the connection mechanism 136, a second point of mechanical coupling that opposes rotational movement of the upper panel 134 in at least one direction. Different to the above described attachment mechanism, the stabilization mechanism does not necessarily provide a secure attachment that requires manual manipulation to engage or disengage the mechanism. For example, in the depicted embodiment, the stabilization mechanism is provided by angled planar tabs 156 (identified in FIG. 2) that extend away from the first and second sidewalls. The angled planar tabs 156 are configured such that the upper panel 134 can be rested upon the angled planar tabs 156, with the angled planar tabs 156 physically supporting the upper panel 134 and maintaining the upper panel 134 in the second position. To this end, a contact surface of the angled planar tabs 156 can be oriented at the desired orientation angle for the second position, e.g., about one hundred thirty-five degrees, relative to the back panel 102 in the example provided above. More generally, the stabilization mechanism can be provided any structure, e.g., post, clip, etc., that prevents the upper panel 134 from rotating at least in one direction. Moreover, the stabilization mechanism may be provided on only one of the sidewalls 104 in contrast to the depicted embodiment.

Figure 4:
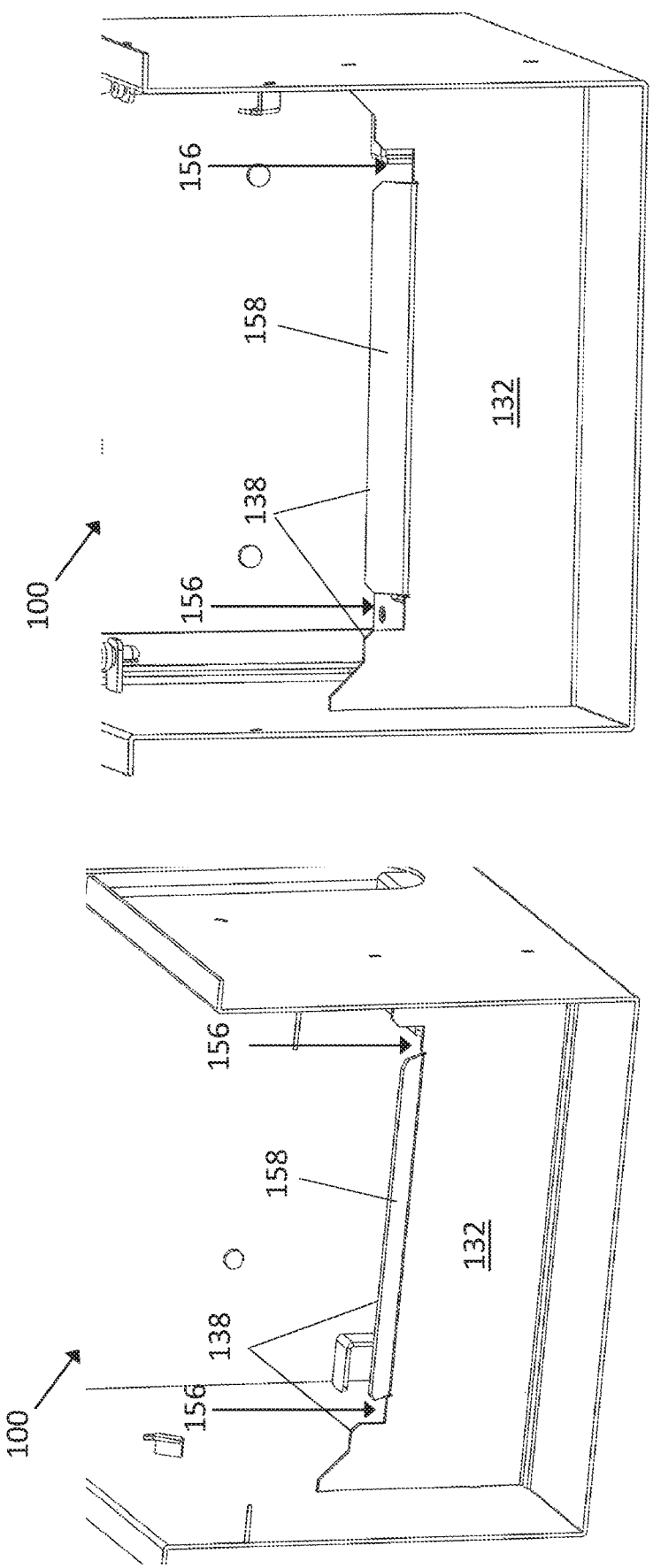
FIG. 4, which includes

According to an embodiment, the connection mechanism 136 includes mating features that are formed in at least one of the upper edge side 138 of the lower panel 132, and the lower edge side 140 of the upper panel 134. Moreover, the mating features are configured to engage the upper edge side 138 of the lower panel 132 with the lower edge side 140 of the upper panel 134 in the first and second positions. That is, the connection mechanism 136 is provided by integrally formed features in the edge sides of the upper and lower panels 132, 134. The mechanical coupling of the connection mechanism 136 as described above is provided by direct contact between these mating features. FIGS. 4-5 illustrate an exemplary configuration of such a connection mechanism 136 in closer detail.

Referring to FIG. 4, the mating features include a pair of notches 156 that are formed in the upper edge side 138 of the lower panel 132. These notches 156 are recesses formed in the upper edge side 138 of the lower panel 132 that extend towards the back panel 102. Additionally, the mating features include an angled planar section 158 of the lower panel 132 that laterally extends between the notches 156. The angled planar section 158 is tilted towards the second cable storage region 124. In an embodiment, the angle of tilt of the angled planar section 158 is correlated to the angle of tilt of the upper panel 134 in the first position. Using the above described example wherein in the first position the angle between the first face 146 and the back panel 102 is about one hundred thirty-five degrees, the angled planar section 158 can correspondingly be angled at about one hundred thirty-five degrees, relative to the back panel 102. In this configuration, the angled planar section 158 provides a platform that stabilizes the upper panel 134 in the first position. Moreover, this platform can work in conjunction with the attachment mechanism to provide stabilization force to the upper panel 134 at both ends.

Referring to FIG. 5, the mating features additionally include a pair of planar mating tabs 160 formed in the lower edge side 140 of the upper panel 134. The planar mating tabs 160 are dimensioned to be inserted and engage with the notches 156. This means that the width of the planar mating tabs 160 is substantially close to the width of the notches 156. As a result, the planar mating tabs 160 can be inserted into the notches 156 with loose contact between the vertical sides of the notches 156 and the vertical sides of the planar mating tabs 160, e.g., as shown in FIG. 5. When the planar mating tabs 160 are engaged with the notches 156, the upper panel 134 is laterally stabilized and unable to slide past the lower panel 132 in a direction that is parallel to the first and second sidewalls. This engagement provides the mechanical coupling between the upper edge side 138 of the lower panel 132 and the lower edge side 140 of the upper panel 134 in the first position and in the second position.

A user of the telecommunications box 100 can move the upper panel 134 from the first position to the second position and vice-versa in the following way. When the upper panel 134 is engaged with the lower panel 132 and in the first position, e.g., as shown in FIG. 5A, the upper panel 134 can be manually pulled away from the lower panel 132 such that the planar mating tabs 160 and notches 156 no longer engage with one another. The upper panel 134 is then moved to the opposite side of the bulkhead 120, tilted in the opposite direction, and moved downward such that the planar mating tabs 160 engage with the notches 156, e.g., as shown in FIG. 5B. Put another way, the connection mechanism 136 of the depicted embodiment requires manual removal and reengagement of the upper panel 134 when the user seeks to change the direction of tilt from the first cable storage region 122 to the second cable storage region 124.

While FIGS. 4-5 illustrate one example of the connection mechanism 136 being provided by mating features formed in the edge sides of the upper and lower panels 132, 134, more generally, these mating features can have a variety of different configurations. For example, other embodiments may include one, three, four, five, etc. of the notches 156 and planar mating tabs 160, wherein the notches 156 and planar mating tabs 160 are dimensioned to engage with one another in a similar manner as discussed herein. Moreover, other embodiments may include mating features on only one of the upper and lower panels 132, 134, wherein the other panel includes a straight edge side that interfaces with the mating features. In yet another example, the mating features may include a hook in the upper panel 134 that is configured to engage with a corresponding opening in the lower panel 132, thus enabling a pivot when engaged.

The telecommunications box 100 as described herein can be produced from a rigid, durable material, e.g., plastic, metal, etc., using a variety of known manufacturing techniques. According to an embodiment, at least the enclosure and the bulkhead 120 can be produced from planar sheet metal. More particularly, a single piece of sheet material (e.g., sheet metal) can be cut and assembled to form the enclosure. The cut planar sections may be joined using techniques such as riveting, welding, etc. The bulkhead 120 can be provided from the same or separate piece of sheet material as the back panel 102 and sidewalls 104.

Advantageously, the connection mechanism 136 described herein can be formed concurrently in the above described process for forming the telecommunications box 100 from a piece or pieces of sheet material. In particular, the upper and lower panels 132, 134 can be provided by cutting a single piece of sheet material, wherein the cut simultaneously forms the upper edge side 138 of the lower panel 132 and the lower edge side 140 of the upper panel 134. The notches 156 and planar mating tabs 160 can be directly formed from this cut. Alternatively, the notches 156 and planar mating tabs 160 can be formed thereafter. The angled planar section 158 can be formed by a simple bending step after forming the cut. Alternatively, the angled planar section 158 can be formed simultaneously by a step that cuts and punches the sheet material. Forming the connection mechanism 136 according this technique eliminates the need to provide and attach a separate connection mechanism, e.g., a hinge, fastener, etc., to the upper and lower panels 132, 134 in order to provide the adjustable bulkhead configuration described herein.

The telecommunications box 100 having a movable upper panel 134 bulkhead 120 configuration according to embodiments described herein may be used in a fiber to the antenna (FTTA) installation. In such an installation, the telecommunications box 100 is mounted on top of a wireless communications tower. Service provider cabling (i.e., fiber optic cabling belonging to a fiber optic telecommunications provider) is routed from the ground through the first cable entry port 126 and into the first cable storage area 122. Customer cabling (i.e., fiber optic cabling belonging to a customer, such as a wireless carrier) is routed from wireless antennas mounted at elevation on the tower through the second cable entry port 128 and into the second cable storage area 124. A service connection between the service provider network and the wireless antennas is completed by connecting the service provider cabling and the customer cabling to the fiber optic connectors 144 (shown in FIGS. 1-3) that are provided in the opening 142 of the upper panel 134.

The configuration of the movable upper panel 134 described herein allows for easy access to the fiber optic connection points, e.g., the fiber optic connectors 144 shown in FIGS. 1-3, which may be particularly beneficial in the context of an FTTA installation. For example, the first position arrangement of FIG. 2 advantageously provides easy access to the fiber optic connections at the customer side, i.e., from within the second cable storage region 124. In this arrangement, the endpoints of fiber optic connectors 144 are tilted towards the open-door of the telecommunications box 100. As a result, an installer seeking to add or modify connections at the customer side can easily access the endpoints of fiber optic connectors 144, as they face the open-door side of the box. Moreover, because the upper panel 134 is tilted towards the first cable storage region 122, a larger proportion of the interior volume 102 is devoted to the second cable storage region 124. This provides more room for an installer to move and manipulate customer-side cable while adding or modifying connections. Correspondingly, the telecommunications box 100 can be moved to the second position arrangement of FIG. 3 to provide similar advantages for an installer seeking to add or modify connections at the service provider side. This design compares favorably to a fixed bulkhead configuration wherein a bulkhead is perpendicular to the back plane of the box. In such a fixed bulkhead configuration, the fiber optic connection points are difficult to see and/or access, as they do not face the open-door side of the box. Moreover, in such a fixed bulkhead configuration, there is no ability to change the volume of cable storage area. Particularly when an installer is harnessed at the top of a telecommunications tower, the flexibility and ease of access provided by the telecommunications box 100 described herein provides an advantageously ergonomic design.

In the above described FTTA installation, the first position arrangement of FIG. 2 may be a default position of the box, whereas the second position arrangement of FIG. 3 may be a temporary position. In many FTTA installations, the customer side fiber optic connections are modified with greater frequency than the provide sider fiber optic connections. Hence, it may be preferable to configure the telecommunications box 100 to remain securely in the position that is more suitable for customer side access, e.g., the first position arrangement as described herein. To this end, the embodiments described herein utilize the attachment mechanism to secure the upper panel 134 in the first position. As this mechanism provides a more secure connection that locks the upper panel 134 in place, it is better suited for the default position. Conversely, the embodiments described herein utilize the stabilization mechanism for the second position, which is a temporary position. When an installer seeks to modify the provider side fiber optic connections, the stabilization mechanism described herein allows for the upper panel 134 to be temporarily moved to the second position, and easily moved back to the first position without disengaging any mechanism. Of course, different application settings may have different requirements. Thus, different embodiments of the telecommunications box 100 may include features similar or identical to the attachment mechanism to secure the upper panel 134 in multiple positions and/or may include features similar or identical to the stabilization mechanism to maintain the upper panel 134 in multiple positions.

The term "generally planar" as used herein refers to a surface that mainly extends along a single plane. A generally planar surface may slightly deviate from a single plane, due to manufacturing process variations, assembly, and other factors that may cause a deviation from the ideal. Moreover, a generally planar surface may include intentionally formed structures that protrude away from the single plane, e.g., detents, retention structures, etc., provided that these intentionally formed structures represent a substantial minority (e.g., less than 10%) of the surface area of the structure.

The term "panel" as used herein refers to a structure with two generally planar surfaces that are separated from one another by a thickness which remains substantially constant throughout the structure.

The term "substantially" encompasses absolute conformity with a requirement as well as minor deviation from absolute conformity with the requirement due to manufacturing process variations, assembly, and other factors that may cause a deviation from the ideal. Provided that the deviations are not significant enough to prevent the structure from being assembled in the manner described herein or from meeting the functional requirements described herein, the term "substantially" encompasses any of these deviations.

Spatially relative terms, such as "top," "bottom," "front," "back," "upper," "lower," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A telecommunications box, comprising:
   a back panel;
   outer sidewalls that adjoin the back panel and form an enclosed loop around an interior volume; and
   a bulkhead that divides the interior volume into first and second cable storage regions,
   wherein the bulkhead comprises:
   a generally planar lower panel that is fixedly attached to the back panel;
   a generally planar upper panel comprising an opening that is dimensioned to receive one or more standardized fiber optic connectors; and
   a connection mechanism that is configured to permit the upper panel to be positioned in a first position and a second position,
   wherein the first and second positions are different angular orientations of the upper panel relative to the back panel, and
   wherein the connection mechanism mechanically couples an upper edge side of the lower panel with a lower edge side of the upper panel in both of the first and second positions.

2. The telecommunications box of claim 1, wherein in the first and second positions a first face of the upper panel faces the first cable storage region and a second face of the upper panel faces the second cable storage region, wherein in the first position an angle between the first face and the back panel is less than one hundred eighty degrees, and wherein in the second position an angle between the second face and the back panel is less than one hundred eighty degrees.

3. The telecommunications box of claim 2, wherein in the first position, the first cable storage region has a greater volume than the second cable storage region, and wherein in the second position, the second cable storage region has a greater volume than the first cable storage region.

4. The telecommunications box of claim 2, wherein the lower panel is substantially perpendicular to the back panel, wherein in the first position the upper panel forms an obtuse angle with the lower panel, and wherein in the second position, the upper panel forms a reflex angle with the lower panel.

5. The telecommunications box of claim 2, wherein the connection mechanism comprises mating features that are formed in at least one of: the upper edge side of the lower panel, and the lower edge side of the upper panel, and wherein the mating features are configured to engage the upper edge side of the lower panel with the lower edge side of the upper panel in the first and second positions.

6. The telecommunications box of claim 5, wherein the mating features comprise a notch that is formed in the upper edge side of the lower panel, and a planar tab formed in the lower edge side of the upper panel, wherein the planar tab is dimensioned to insertably receive and engage with the notch.

7. The telecommunications box of claim 5, wherein the lower panel comprises two of the notches, wherein the upper panel comprises two of the planar tabs, and wherein the lower panel further comprises an angled planar section that is disposed between the two of the notches, wherein the angled planar section is tilted towards the second cable storage region.

8. The telecommunications box of claim 1, wherein the outer sidewalls comprise first and second sidewalls that are spaced apart from one another, and wherein the lower panel extends between the first and second sidewalls and is fixedly attached to the first and second sidewalls.

9. The telecommunications box of claim 8, further comprising an attachment mechanism that is configured to securely retain the upper panel to one or both of the first and second sidewalls with the upper panel in the first position.

10. The telecommunications box of claim 9, wherein the attachment mechanism comprises a planar tab extending away from one or both of the first and second sidewalls, and a fastener disposed at an upper edge side of the upper panel, wherein the planar tab comprises a perforation that is dimensioned to securely retain the fastener when inserted therein.

11. The telecommunications box of claim 8, further comprising a stabilization mechanism that is configured to maintain the upper panel in the second position.

12. The telecommunications box of claim 11, wherein the stabilization mechanism comprises an angled planar tab extending away from one or both of the first and second sidewalls, and wherein the angled planar tab is configured to maintain the upper panel in the second position by resting the upper panel upon the planar tab.

13. The telecommunications box of claim 8, further comprising:
   a door that is configured to enclose the interior volume in a shut position by contacting front edge sides of the sidewalls that are opposite from the back panel;
   a first cable entry port in the first or second sidewall that provides access to the first cable storage region; and
   a second cable entry port in the first or second sidewall that provides access to the second cable storage region.

14. A method of producing a telecommunications box, the method comprising:
   providing an enclosure comprising a back panel, outer sidewalls that adjoin the back panel and form an enclosed loop around an interior volume; and
   providing a bulkhead in the enclosure that divides the interior volume into first and second cable storage regions,
   wherein providing the bulkhead comprises:
   providing a generally planar lower panel that is fixedly attached to the back panel;
   providing a generally planar upper panel comprising an opening that is dimensioned to receive one or more standardized fiber optic connectors; and
   providing a connection mechanism that is configured to permit the upper panel to be positioned in a first position and a second position,
   wherein the first and second positions are different angular orientations of the upper panel relative to the back panel, and wherein the connection mechanism mechanically couples an upper edge side of the lower panel with a lower edge side of the upper panel in both of the first and second position.

15. The method of claim 14, wherein providing the connection mechanism comprises forming mating features in at least one of: the upper edge side of the lower panel, and the lower edge side of the upper panel.

16. The method of claim 15, wherein the upper and lower panels are each provided from a substantially planar metal sheet or sheets, and wherein forming the mating features comprises cutting the substantially planar metal sheet or sheets.

17. The method of claim 16, wherein forming the mating features comprises forming two notches in the upper edge side of the lower panel and an angled planar section between the notches.

18. The method of claim 17, wherein forming angled planar section comprises bending the planar sheet that is used to form the lower panel.

\* \* \* \* \*